United States Patent [19]

Whalen

[11] 4,374,506
[45] Feb. 22, 1983

[54] AUTOMATIC FLUE GAS HEAT RECOVERY SYSTEM

[76] Inventor: Daniel A. Whalen, 5031 Mont Clair #A, Peoria Heights, Ill. 61614

[21] Appl. No.: 303,533

[22] Filed: Sep. 18, 1981

[51] Int. Cl.³ .................... F22B 33/00; F24C 13/00
[52] U.S. Cl. ................................ 122/20 B; 126/31; 165/40; 165/DIG. 12; 122/421; 236/21 R
[58] Field of Search .............. 126/121, 5, 420, 101, 126/31; 237/51, 55; 165/DIG. 12, 40; 122/20 B, 421; 137/59, 60, 61, 62; 236/21 R

[56] References Cited

U.S. PATENT DOCUMENTS

| | | | |
|---|---|---|---|
| 2,372,086 | 3/1945 | Kahn | 126/5 |
| 3,096,021 | 7/1963 | Lintvedt | 236/20 |
| 3,896,992 | 7/1975 | Borovina | 237/19 |
| 3,999,709 | 12/1976 | Estabrook | 237/8 R |
| 4,048,962 | 9/1977 | Pristelski | 122/20 B |
| 4,066,210 | 1/1978 | Pemberton | 237/53 |
| 4,136,731 | 1/1979 | DeBoer | 165/12 |
| 4,143,817 | 3/1979 | Oliver | 122/20 B |
| 4,211,187 | 7/1980 | Farris | 122/20 |
| 4,216,903 | 8/1980 | Giuffre | 237/8 R |
| 4,246,886 | 1/1981 | Sitzlar | 126/420 |

*Primary Examiner*—Albert J. Makay
*Assistant Examiner*—Henry Bennett
*Attorney, Agent, or Firm*—McCaleb, Lucas & Brugman

[57] ABSTRACT

An automatic flue gas heat recovery system for supplementing or replacing a conventional, separate hot water system. In the example described, the heat recovery system is applied to a pizza restaurant where large quantities of heat energy are normally wasted up an oven chimney stack, and large quantities of hot water also are required for restaurant operations. An electric motor driven pump circulates water in a closed loop between a storage tank and a heat exchanger tube located in the oven chimney stack. A thermostat control automatically starts the pump when the oven heats the chimney stack to an effective water heating temperature. When temperature in the storage tank reaches a predetermined maximum, the thermostat control stops the pump, opens a drain valve, and dumps water quickly and completely from the heat exchanger tube. Three different embodiments are shown and described illustrating systems with one or more storage tanks and one or more pumps. In the plural storage tank embodiments, an existing hot water heating tank may be converted for use to augment a main tank supplied with the present system.

13 Claims, 4 Drawing Figures

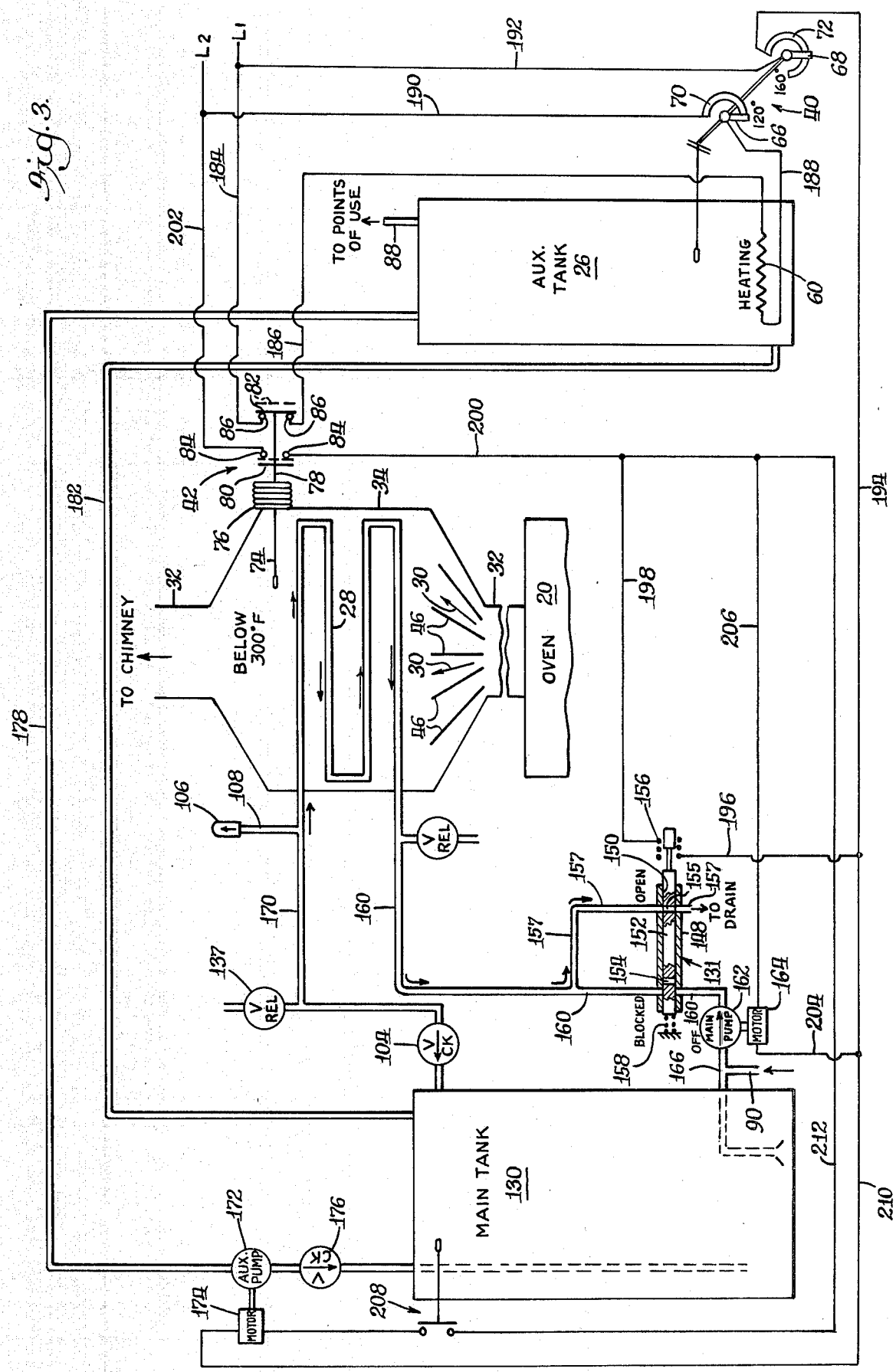

AUTOMATIC FLUE GAS HEAT RECOVERY SYSTEM

BACKGROUND OF THE INVENTION

Forced air ovens and furnaces such as those used in baking certain foods such as pizzas waste 90% or more of their heat input up the exhaust flue. Air is pulled in, heated, moved in a single pass over the product being baked, and exhausted immediately up the flue. The desirability of increasing the efficiency of these units has risen with the upward spiral of energy costs. Attempts have been made to conserve energy by recycling the heated air in multiple passes but this has required complicated and expensive machinery, and, when applied to pizza baking operations for example, have always resulted in a pizza product having degraded taste or texture.

In a typical pizza restaurant, the oven may be rated at a maximum of 70 kilowatts electrical power input. It will maintain a full oven baking temperature of 500° F. with a constant average input of 33 kilowatts or 113,000 BTU per hour. About 5% is used in heating the room, 4% is absorbed by the product being baked, and about 91% is constantly lost up the stack. This is approximately 30 kilowatts or 102,400 BTU per hour lost, hour after hour, twelve hours a day.

That same, typical pizza restaurant is likely to have a 45 kilowatt electric water heater which will run approximately half the time with an average input of 23 kilowatts or 78,506 BTU per hour. Therefore, if only 77% of the waste heat going up the stack could be re-captured and used for water heating purposes, no primary energy would be needed.

Because of such substantial energy requirements just to generate the hot water needed in a pizza restaurant, if all or even a major part of the energy needed for hot water could be recovered from the stack, the cost saving would be astounding, amounting to many thousands of dollars per year in a single medium size restaurant operating only twelve hours per day.

Users of electrical energy for ovens of this type are charged by the power generating utility in two ways: first, for the actual amount of power consumed; and, second, for the peak load capacity which the power company has to maintain. Thus, cost savings could result in excess of the actual energy savings, simply by lowering the peak KW demand.

It has long been recognized by people skilled in this field that utilizing the waste flue heat to produce hot water for cleaning, cooking, heating and general washroom and restaurant use would be the answer to recovering some of this wasted energy. A problem never solved prior to the present invention has been how to limit or stop heat transfer from a high capacity oven or furnace, to the water in which the recovered heat is being transferred, when the storage tank or tanks are at their maximum temperatures and no further temperature increase would be safe or desirable at that particular time.

As a practical matter, 160° F. is the maximum temperature that water should be heated in a coil, and stored in a tank at ordinary domestic tap water pressures, without causing localized boiling and lime deposition. Since the flue gases are always at much higher temperatures than the boiling point of water, simply stopping the flow in the heat recovery coil could allow the water in the coil to rise to dangerous temperatures and pressures.

Prior art systems have attemped to solve this problem in various ways. Farris U.S. Pat. No. 4,211,187 allows the water to boil out of the heat recovery coil into a holding tank. Estabrook U.S. Pat. No. 3,999,709 dissipates the excess heat through a secondary coil when the holding tank is at its predetermined maximum temperature. Pemberton et al U.S. Pat. No. 4,066,210 simply stops the circulatory flow and does not address the problem of overheating in the coil tubes. Borovina et al U.S. Pat. No. 3,896,992 and DeBoer U.S. Pat. No. 4,136,731 both have systems designed for very low output home-type furnaces. These home-type furnace systems do not adequately solve the problem of overheating in the heat recovery coil tubes; they simply rely on a thermal siphon method of holding down temperature which is inadequate for a high output oven with flue temperatures reaching 600°-700° F. Each of these prior art systems fail the test of practicality because of inefficiency, complexity, tendency for lime to build up, or the possibility of overheating or overpressure leading to rupture of a tube or tank. For these reasons, none of the systems developed in the past are practical for use on a high capacity oven.

Accordingly, this situation is in need of improvement.

SUMMARY OF THE INVENTION

A general object of the present invention is to reduce or eliminate the need for using primary energy to produce hot water in and around operations such as pizza restaurants having forced air ovens and furnaces.

A particular object of the present invention is to transfer heat from hot oven flue gases to water in a heat recovery tube and circulate it to a hot water storage tank for use as and when needed.

An important part of the invention is a solution to the problem of stopping heat transfer from the heat exchanger tube to the circulating water medium once it has reached a practical maximum temperature, 160° F. or thereabouts, above which there is the likelihood that lime precipitation within the tube may lead to dangerous overpressures and tube or tank rupture.

More specifically, in the system of the present invention, when the water temperature reaches a predetermined maximum, a drain valve for the heat recovery tube automatically opens, dumping the water immediately and completely from the heat recovery tube, eliminating any possibility of excess water temperatures or pressures and preventing lime deposition in the heat recovery tube.

GENERAL DESCRIPTION OF THE PREFERRED EMBODIMENTS

Other objects and advantages will be apparent from the following description taken in connection with the accompanying drawings in which:

FIG. 3 is still another embodiment of the invention utilizing two storage tanks and separately operable circulating pumps.

Like parts are indicated by like reference characters throughout the figures of the drawings.

DETAILED DESCRIPTION OF THE PREFERRED EMBODIMENTS

Figure 1:
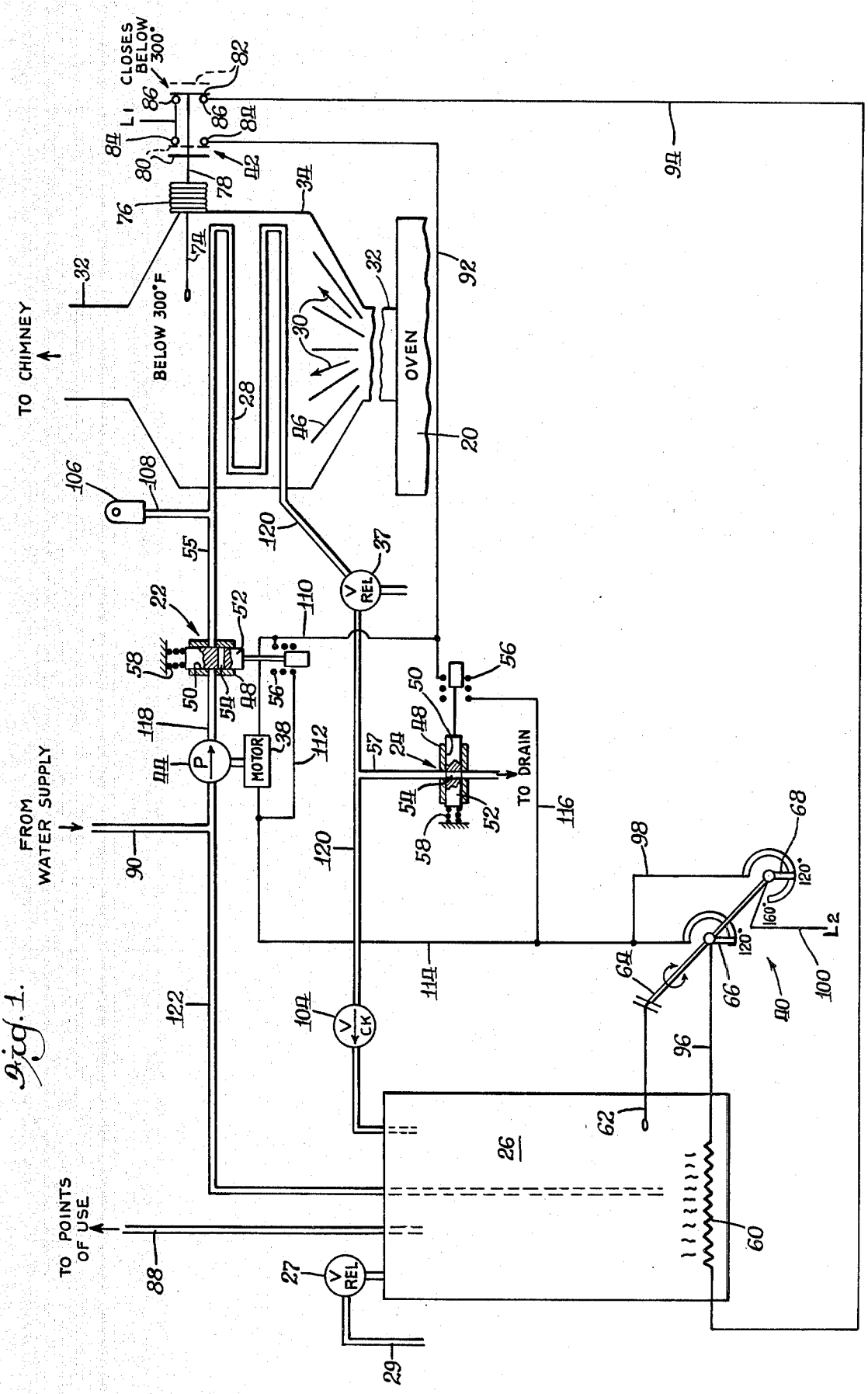
FIG. 1 is a diagrammatic view of one embodiment of the present invention utilizing a single hot water storage tank.

A preferred embodiment of this invention is shown in FIG. 1 which illustrates a system for recovering heat conventionally lost in the hot flue gases of an oven and using it to provide hot water.

The system comprises an oven 20, water flow control electric solenoid valves 22 and 24, a hot water storage tank 26, a heat exchanger housing 34 connected in a flue 32 between oven 20 and a chimney (not shown), a heat exchanger coil or tube 28 within the housing, a hot water circulating pump 44 driven by electric motor 38, and thermostat control units 40 and 42.

A prime example of a location where the invention is extremely beneficial is in a restaurant where pizzas are baked on the premises and where large quantities of very hot water are needed for washing, cleaning, restrooms and general restaurant purposes. For best results, to provide a gourmet quality pizza with a proper, delicate crust and flavor, it must be baked quickly at a very high temperature. Flue gas temperatures up to 700° F. are typical.

For purpose of a specific example, the oven 20 is illustrated as a pizza oven. Flue gases 30 exhausting from the oven into the heat exchanger housing 34 are evenly distributed across the coil 28 by deflection baffles 46.

Each valve 22 and 24 comprises, in the simplified form shown, a suitable valve body 48 defining a bore chamber or bore 50 and reciprocably receives valve slide 52 formed with passageway 54. In valve 22, the slide moves passageway 54 to and from an open position aligned with water recirculation conduit 55; similarly, in valve 24, the slide moves passageway 54 to and from an open position aligned with water drain conduit 57.

Each valve slide is associated with a solenoid 56 which, when energized, moves the slide against a biasing spring 58. Valve 22 is normally closed, that is, when its solenoid is de-energized, the spring moves slide 52 to the FIG. 1 position where it communicates between conduit 118 and recirculation conduit 55. Valve 24 is normally open, that is, when its solenoid is de-energized, the spring moves the slide 52 to the FIG. 1 position where its passageway 54 opens drain line conduit 57.

Hot water storage tank 26 has an electric heating coil 60 which is energizable to maintain a minimum water temperature at night and other times when the oven 20 may be off for extended times. The tank is equipped with a safety pressure relief valve 27 and discharge conduit 29.

Thermostat control 40 comprises, in the schematic form shown, a temperature sensor 62 extending into the tank, a rotatable shaft 64 which is rotatable clockwise with increasing temperature, and counterclockwise with decreasing temperature. Electrical contact blades 66 and 68 are mounted on the shaft and rotatable with it. They are in wiping engagement with arcuate contacts 70 and 72 respectively. Contact 70 is somewhat shorter than 72. In the example shown, wiper blade 66 disengages contact 70 at and above 120° F.; and wiper blade 68 disengages contact 72 at and above 160° F.

Thermostat control 42 comprises, in the schematic form shown, a temperature sensor 74 extending into the heat exchanger housing 34. This is associated with a bellows 76 and a reciprocable shaft 78 carrying movable switch blades 80 and 82. When the temperature sensed by sensor 74 is below 300° F., indicating the oven 20 is off, the bellows 76 will contract, disconnecting blade 80 from contacts 84,84 and connecting blade 82 with contacts 86, 86 as shown in solid lines in FIG. 1. When the temperature sensed by sensor 74 is above 300° F., indicating the oven 20 is on, the bellows 76 will expand, connecting blade 80 with contacts 84, 84 and disconnecting blade 82 from contacts 86, 86 as shown in broken lines in FIG. 1.

Water outlet conduit 88 is connected to suitable points of use such as hot water service lines in the restaurant, in the example given. Water inlet conduit 90 is connected to a suitable private or municipal supply of fresh, clean water under pressure.

The system of the present invention functions completely automatically, transferring heat from the oven flue gases 30 to the hot water storage tank 26 when the oven is on and the tank is calling for heat. When the oven is shut down for an extended period, the system automatically maintains a minimum temperature in the tank by energizing electric coil 60 from time to time. A very important feature of the invention is that, when the oven is on and the storage tank is at maximum temperature, and therefore no additional hot water is needed, the water discharge valve 24 is automatically opened to dump the water from the heat exchanger coil immediately and completely. This prevents overheating, boiling, liming out, and possible dangerous pressure build-up in the heat exchanger coil.

A complete operating cycle for the system will now be described.

First, consider the "OFF" mode shown in FIG. 1. This is the system condition after regular business hours when the restaurant is closed. The oven is off and cold, so the temperature in heat exchanger housing 34 is below 300° F. In thermostat control 42, blade 80 is open, disconnecting line 92 from electrical power line $L_1$ thereby de-energizing motor 38 to stop pump 44, and de-energizing solenoids 56 of valves 22 and 24 causing them to assume their normally closed and open positions respectively. Open valve 24 drains the heat exchanger coil 28, and water conduits 55 and 120 all the way back to closed valve 22 and check valve 104, respectively. Vacuum breaker vent valve 106, connected by conduit 108 to conduit 55, allows air to enter and replace the water in heat exchanger tube 28. One such vent valve which is highly satisfactory is Model R561 marketed by RICHDEL, INC., Solar Products Co., Carson City, Nevada. Vent valve 106 is of the type allowing air to pass in either direction without allowing water to flow out.

Further, in the "OFF" mode, blade 82 in thermostat control 42 is closed, connecting power line $L_1$ through line 94 to heating element 60 in storage tank 26. The opposite end of heating element 60 is connected through line 96, wiper blade 66, arcuate contact 70, line 98, arcuate contact 72, wiper blade 68, and line 100 to electrical power line $L_2$. At temperatures below 120° F., blade 66 engages arcuate contact 70, energizing the heating element, thereby maintaining the storage tank at 120° F. for immediate use when the restaurant opens. 120° F. is only one example of a suitable holding temperature. If the pizza oven is not on full time during restaurant hours to provide hot water in sufficient quantity or at high enough temperature, arcuate contact 70 may be longer to provide a holding temperature higher than 120° F. in tank 26. Alternatively, a modification (not shown) of control 40 may be provided in which the holding temperature is manually adjustable to fit different operating conditions.

Next, consider the "ON" mode, as for example when the oven 20 is placed in operation following the extended "OFF" mode period just described. As soon as flue gases 30 heat sensor 74 above 300° F., switch blades 80 and 82 are moved to closed and open positions, respectively, as shown in broken lines in FIG. 1. Opening blade 82 de-energizes heating element 60. Closing blade 80 simultaneously energizes both valve solenoids 56, 56 and pump motor 38. The solenoid of valve 22, and pump motor 38 are energized by a circuit extending between power lines $L_1$ and $L_2$ via lines 92, 110, 112, 114 and 98, arcuate contact 72, wiper blade 68, and line 100. The solenoid of valve 24 is energized by a circuit extending between power lines $L_1$ and $L_2$ via lines 92, 116, 114, 98, arcuate contact 72, wiper blade 68, and line 100.

Thus, in response to operation of the oven, heating element 60 is de-energized, drain valve 24 closes, valve 22 opens, and pump 44 circulates water in a closed loop between heat exchanger coil 28 and hot water storage tank 26 via conduit 118, shut-off valve 22, conduits 55, 120 and 122. Flow in this loop is in the direction determined by the orientation arrow on check valve 104.

An important feature of the invention is that the heat exchanger coil 28 is inherently self-cleaning. Because the coil is dumped by drain valve 24 each time the water temperature reaches 160° F., there is very little liming inside it. At the beginning of the "ON" mode, as described above, the coil is heated to about 300° F. before inlet valve 22 is opened to admit water to the coil. The coil is made of copper, steel, or other metal, so it stretches substantially differently from any lime accretion inside it, so it will be loosened by heating. Then, when inlet valve 22 opens and injects relatively cool water into the hot coil, the resulting thermal shock will scour any loosened lime from the coil surface.

Air, which replaced water in coil 28 when drain valve 24 was opened at the beginning of the "OFF" mode, will be purged from vent valve 106 when it appears in conduit 55 at the beginning of the "ON" mode. Cold make-up water will enter through conduit 90 as air is vented and enhance the lime-loosening thermal shock effect described above. The sudden influx of water will blast the loosened lime off the coil wall.

In the "ON" mode, water temperature continues to increase until it reaches some predetermined maximum value above which further heating is neither needed nor desirable. While this value may vary from one application to another, 160° F. is a practical maximum temperature in the equipment illustrated. This is sufficiently below the practical boiling point of water in the heat exchanger coil 28 that boiling and liming are not likely to occur even in localized hot spots and cavitation areas. For this reason, the maximum water temperature, determined by contact 72 of control 40, is fixed at 160° F. Alternatively, a modification (not shown) of control 40 may be provided in which the maximum temperature is adjustable to suit a particular application.

In the "ON" mode described above, with water circulating between the coil 28 and tank 26 at the rate of, say, 13 gallons a minute, and assuming none is drawn off through outlet conduit 88, the temperature rise across the coil will be 7° F. to 9° F. When the predetermined maximum of 160° F. is sensed by sensor 62 in control 40, wiper contact 68 runs off the end of the arcuate contact 72. This de-energizes the entire system by disconnecting power line $L_1$. This simultaneously de-energizes pump motor 38 and both valve solenoids 56, stopping the pump, closing inlet control valve 22 and opening drain valve 24. The water in coil 28 will instantly be dumped through wide-open valve 24 and drain conduit 57. This is an important feature of the invention because, if the temperature of water in the coil 28 is allowed to increase much above 160° F. as the oven continues to heat the coil, it would turn to steam and the coil would fill up with lime deposits in a short time. Further, pressure would build up and, if both emergency relief valves 27 and 37 failed to open, the coil 28 or one of the connecting conduits would burst.

After the system is closed down at the maximum 160° F. temperature as described above, and with the oven still on, hot water may be drawn through outlet conduit 88. Cold make-up water from conduits 90 and 122 will lower the temperature in the tank. When the water temperature in the tank drops sufficiently to re-engage wiper blade 68 with arcuate contact 72, the system is re-activated through power line $L_2$. Pump motor 38 and both valve solenoids 56 are energized. Valve 22 is opened, valve 24 is closed, and pump 44 again circulates water between the heat exchanger coil 28 and storage tank 26 until the 160° F. maximum is reached and the coil once again emptied through drain valve 24.

Thermostat control 40 is illustrated only schematically, with wiper blade 66 engaging arcuate contact 70 below 120° F. and with wiper blade 68 engaging arcuate contact 72 below 160° F. for simplicity. The actual hardware will be somewhat more complicated. While, as the storage tank temperature increases, wiper blades 66 and 68 will disconnect from the contacts at 120° F. and 160° F. respectively, they will reconnect at somewhat lower temperatures for example 110° F. and 150° F. respectively, to avoid hunting. A simple way of accomplishing this is with some lost motion between shaft 64 and blades 66 and 68. This is conventional control switch construction so will not be described in further detail.

When the oven 20 is shut off and the restaurant closes for the night, the system automatically goes into a standby mode. In control 42, switch blade 80 opens, stopping pump 44, closing inlet valve 22 and opening drain valve 24 to dump the water from coil 28. Heating element 60 is energized from time to time only as necessary to maintain the 120° F. predetermined holding temperature in the tank.

Figure 4:
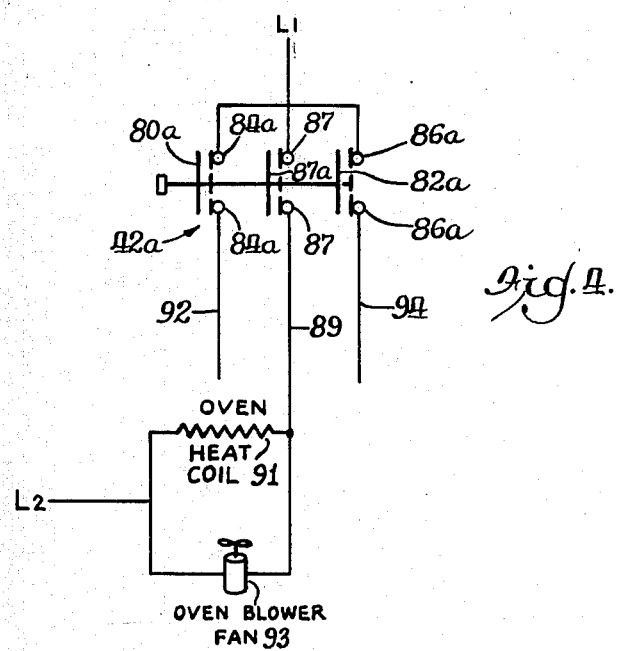
FIG. 4 is a schematic drawing of a modified oven control circuit.

Alternatively, instead of making the operation of valves 22 and 24 and pump 44 *responsive to* flue gas temperature in housing 34, they may be energized and de-energized concurrently with the oven heater coil as shown in FIG. 4. A manually operable switch 42a would be substituted for the automatic thermostat control 42. When the switch 42a is in the solid line position shown in FIG. 4, the oven and other components would be off. When switch 42a is closed, that is, moved to the broken line position shown, the oven heater coil 91 and blower 93 would be connected between $L_1$ and $L_2$ via closed switch blade 87a and conductor 89. Concurrently, the pump 44 and valves 22 and 24 would be energized through conductor 92, and the heater coil 60 would be energizable through conductor 94.

Figure 2:
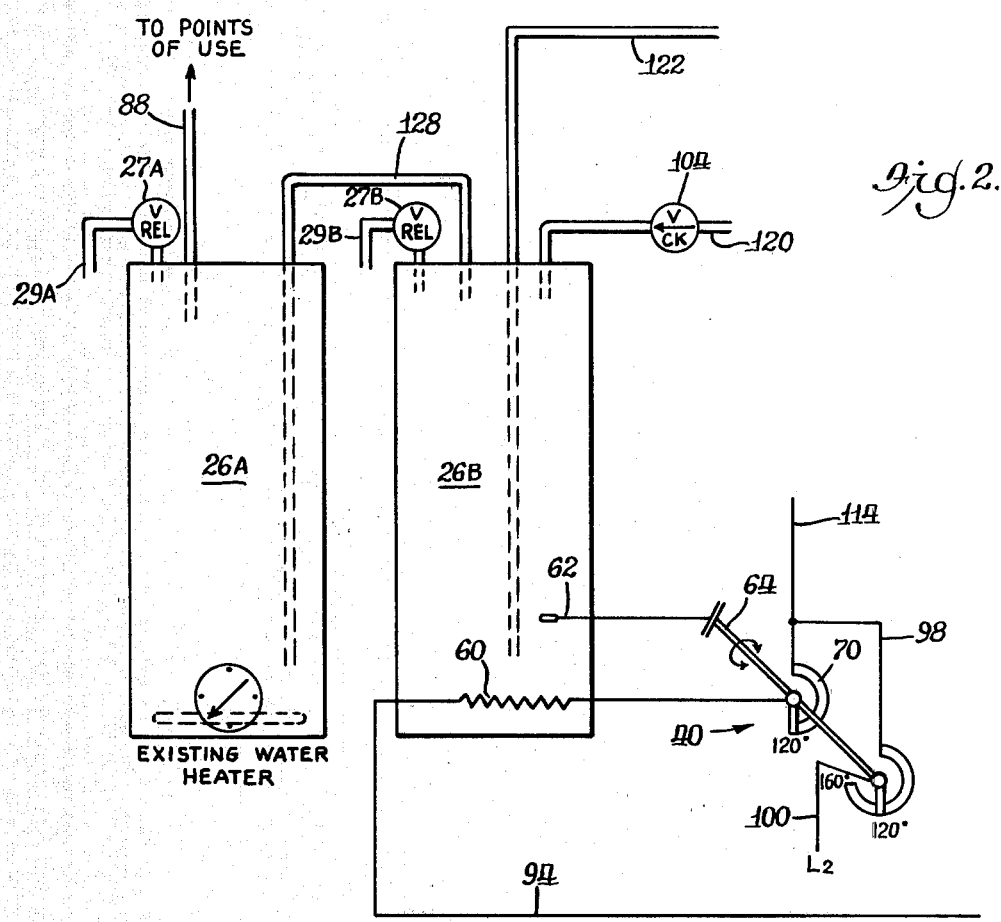
FIG. 2 is a diagrammatic view of another embodiment of the invention showing a variation of FIG. 1 utilizing two hot water storage tanks, one of which may be an existing water heater.

FIG. 2 is a variation of the system shown in FIG. 1 which is in intended for use in an existing restaurant already having a conventional hot water heater 26A. The systems of FIGS. 1 and 2 are the same except that the single, large storage tank 26 is replaced by two separate tanks 26A and 26B. Tank 26A has its own separate inlet and outlet conduits, and its own temperature control. It may be operated either by electricity or by gas. Tank 26B is an additional tank comparable to tank 26 in the respects that they are both connected to water recirculation conduits 120 and 122, both have a heating element 60, and both are associated with the thermostat control 40. Tanks 26A and 26B are interconnected by a crossover conduit 128. Pressure relief valves 27A and 27B connected respectively to discharge conduits 29A and 29B provide individual over pressure protection.

Use and operation of the two tank system shown in FIG. 2 is similar to that described for the one tank system of FIG. 1.

FIG. 3 illustrates another embodiment of the invention. The oven 20, exhaust flue pipe 32, heat exchanger housing 34, heat exchanger coil or tube 28, tank 26 and heating element 60, and thermostat controls 40 and 42 are comparable to the same parts shown in FIG. 1. Tank 26 may be an existing hot water heater already on the premises when the system shown in FIG. 3 is installed. It may therefore be considered an auxiliary tank, augmenting a main tank 130 which is merely a storage tank, having no individual water heating unit. A dual valve 131 comprises, in the simplified form shown, a valve body 148 defining a bore chamber 150 which reciprocably receives valve slide 152 formed with two passageways 154 and 155. The slide 152 is movable by a spring 158 to a right-hand position shown in FIG. 3 where passageway 155 opens a drain conduit 157. A solenoid 156, when energized, moves the slide 152 leftwise against the bias of spring 158 to a position where passageway 154 opens main conduit 160 while passageway 155 moves out of alignment with drain conduit 157 and closes it.

Thus, when solenoid 156 is energized, conduit 160 is open and conduit 157 is closed; and when solenoid 156 is de-energized, conduit 160 is closed and conduit 157 is open.

A main pump 162, driven by an electrical motor 164 is connected to main tank 130 by a suction conduit 166. Main conduit 160 is connected to one end of the heat exchanger coil 28 and an intermediate portion is connected to the drain conduit 157. The opposite end of the heat exchanger coil 28 connects by means of another main conduit 170 to tank 130. A check valve 104 controls the direction of movement of the water within conduit 170. A pressure relief valve 137 protects the coil 28 from over pressures. A vacuum breaker vent valve 106 is connected to the upper leg of the heat exchanger coil 28 by means of a conduit 108, these elements being the same as described in the FIG. 1 embodiment.

An auxiliary pump 172, driven by electric motor 174 is connected, with check valve 176 in auxiliary conduit 178 which interconnects main and auxiliary tanks 130 and 26. An auxiliary or secondary circulation loop is thus provided through auxiliary pump 172 into tank 130, out conduit 182 into tank 26, and out tank 26 through conduit 178 back to pump 172. Auxiliary pump motor 174 is energized to activate this auxiliary circulation loop when flue gases exceed 300° F. and tank 130 is at 120° F. or above.

The system of FIG. 3 also functions completely automatically, transferring heat from the oven flue gases 30 when needed, and dumping water from heat exchanger coil 28 when not needed. As with the other two embodiments described, when the oven is shut down for an extended period, the system automatically maintains a minimum temperature in auxiliary tank 26 by energizing electric coil 60 from time to time to keep the water ready for use at some suitable minimum temperature such as 120° F.

The system has six different modes of operation, depending on system variables, as will be described below.

In Mode 1, the oven is turned off and cold. Only the heating element 60 is energizable by connections to power lines $L_1$ and $L_2$ via line 184, closed blade 82, line 186, heating element 60, line 188, blade 66, arcuate contact 70, and line 190. This keeps the water in tank 26 hot during night time or other periods when the oven is off. This assures hot water to begin restaurant operations at start up. Open switch blade 80 disables both pump motors 164 and 174, and the solenoid 156. Circulation conduit 160 is closed and drain conduit 157 is open to completely drain the heat exchanger coil 28 and thereby prevent lime build-up or possible overheating of water while the oven is cooling down. Tank 130, having no heat input of its own, loses temperature at the rate of 3° F. per hour and may be down to 80°–90° F. when starting up morning operation.

In Mode 2, at morning start up, the oven is turned on and tank 130 has dropped to less than 120° F. overnight. As soon as the oven brings the temperature in the heat exchanger housing above 300° F., the bellows 76 expands, blade 80 closes and blade 82 opens. This disables the heating element 60. It cannot operate while the oven is on. The closing of switch blade 80 energizes both the solenoid 156 and the main pump motor 164. The solenoid is energized between $L_1$ and $L_2$ via a circuit comprising line 192, blade 68, arcuate contact 72, line 194, 196, 198 and 200, blade 80, and line 202. Pump motor 164 is energized by this same circuit plus lines 204 and 206.

The solenoid shifts valve slide 152 to its leftwise position, opening conduit 160 and closing the drain conduit 157. The main pump 162 circulates water in a closed loop between heating coil 28 and tank 130 via main conduits 160, 170 and 166. The air in the heat exchanger coil 28 is purged out through the air vent 182 and make-up water enters through conduit 90 to replace the air. In a typical installation, the temperature in tank 130 rises at about 1 to 1½° F. per minute.

In Mode 3, the oven is still on and the water in tank 130 reaches a temperature of 120° F.

The auxiliary pump 172 has not been operated up to this point because the temperature in tank 130 was below 120° F. This is so the water in tank 26 which has been kept at 120° F. by heating element 60 will not be diluted by the colder water of tank 130. However, when tank 130 reaches 120° F., and the two tanks are therefore at the same temperature, thermostat switch 208 closes and starts auxiliary pump 172. Auxiliary pump motor 174 is energized between power lines $L_1$ and $L_2$ via a circuit comprising the same circuit which simultaneously energizes the main pump motor 164, plus lines 210 and 212 and closed thermostat switch 208.

Now, with main pump circulating water between the heat exchanger coil 28 and tank 130, and the auxiliary pump circulating water between the two tanks, the temperature in both tanks rises at the same rate.

In Mode 4 where the oven is still on and both tanks reach 160° F., the system is at peak temperature. Blade 68 moves beyond the arcuate contact 72 and all the electrical functions are disabled. Both pumps turn off. Solenoid 156 de-energizes, closing conduit 160 and opening drain conduit 157. This drains entire heat exchanger coil 28 quickly and completely, the water being replaced by air entering through the vent 106. Since the oven is still on and exhausting hot gas, if coil 28 were not drained quickly, it would turn to steam, pressure would build up, and if the emergency relief valve 137 failed to open, the coil 28 or one of the parts connected to it would burst. Also, heating the water over 160° F. would cause the coil to fill up with lime deposits in a short time.

In Mode 5, the oven is on and the water in tank 26 drops below 160° F. After having shut down in Mode 4, no heat was transferred to the water, so discharge of water through conduit 88 to the point of use dropped the temperature in tank 26. At this time, blade 68 will again engage the arcuate contact 72. Both pumps 162 and 174 start. Solenoid 156 energizes shifting the valve slide leftwise to open line 160 and close drain line 157. Again, the air in the heat exchanger coil 28 is purged out the air vent 106. The system will then run until both tanks are at 160° F., when the system drops back into Mode 4.

Mode 6 is an emergency mode. In case valve 131 fails to open drain line 157 or in case all power is off, water would be trapped in the heat exchanger coil 28. This would lead to overheating, pressure build up, and possible bursting. For this reason, relief valve 137 is an extremely important component of the FIG. 3 embodiment. In the event of such pressure build up, it will open to bleed off pressure before any harm can be done.

The cost savings of the present invention have been clearly demonstrated in a pizza restaurant in Central Illinois where a conventional electric water heater has been replaced by the present system. During the first three months of operation, energy savings were 23% lower compared with the average for the comparable period in the previous two years as shown in the following chart:

|  | KWH With Old, Conventional System (Cost) | KWH Present System (Cost) | KWH Energy Savings With Present Invention Compared With Average Of Comparable Months In Previous Years |
|---|---|---|---|
|  | 1979 | 1980 | 1981 |  |
| March | 45600 ($2923) | 37280 ($2540) | 32160 ($2326) | 23% |
| April | 42160 ($2794) | 38640 ($2589) | 28560 ($1841) | 30% |
| May | 37360 ($2641) | 33760 ($2299) | 29640 ($1845) | 17% |
| 3-Month Avg. | 41706 | 36560 | 30120 | 23% |

This actual energy use for the three month period averaged 117,400 KWH in 1979 and 1980 at an average cost of $7,948.00 for the three months (based on 1981 rates).

In 1981, for the same period, it was 90,360 KWH at an actual cost of $6,012 for the three months.

This was an astounding savings of 27040 KAH and $1,936 for the three months. This would be a savings of 10860 KWH and $7,744 per year. The monetary savings come from both a drop in the KWH usage plus a drop in the peak KW demand. Th peak KW demand was 140.8 KW in April, 1979, and 89.6 KW in April, 1981, reflecting a disconnected 45 KW water heater used with the former conventional system along with regular variances. This amazing 37% drop in the peak demand is an important part of the cost savings.

The apparatus and techniques described in the embodiments illustrated has been necessarily specific for purposes of illustration. Alterations, extensions and modifications would be obvious to those skilled in the art.

The embodiments of the invention in which an exclusive property or privilege is claimed are defined as follows:

1. In an automatic flue gas heat recovery system:
a heat exchanger housing adapted to be positioned in a flue gas flow from a heat source;
heat exchanger tube means in said housing;
hot water storage tank means;
water inlet and outlet conduits connected to the hot water storage tank means;
conduit means including at least two conduits connecting the tank means with the heat exchanger tube means to provide a closed loop for circulating water therebetween;
motor driven pump means in said conduit means effective when activated to circulate water in the closed loop;
drain valve means being activatable between opened and closed conditions and connected to said conduit means in position to drain said heat exchanger tube means when opened; and
means for de-activating said pump means and opening said drain valve means in response to a temperature in said storage tank means exceeding a predetermined value.

2. In an automatic flue gas heat recovery system:
a heat exchanger housing adapted to be positioned in a flue gas flow from a heat source;
heat exchanger tube means in said housing;
hot water storage tank means;
water inlet and outlet conduits connected to the hot water storage tank means;
conduit means including at least two conduits connecting the tank means with the heat exchanger tube means to provide a closed loop for circulating water therebetween;
motor driven pump means in said conduit means effective when activated to circulate water in the closed loop;
drain valve means being activatable between opened and closed conditions and connected to said conduit means in position to drain said heat exchanger tube means when opened;
thermostat control means including temperature sensor means associated with the storage tank means and connected to the pump means and drain valve means to control activation thereof;
control means including means for activating said pump means and closing said drain valve means in response to the operational status of the heat source; and said thermostat control means including means for deactivating said pump means and opening said drain valve means in response to a temperature in said storage tank means exceeding a predetermined value.

3. In an automatic flue gas heat recovery system according to claim 2 in which said tank means has heating means activatable by said thermostat control means, said thermostat control means being effective to activate said heating means in response to a temperature in said storage tank means below a predetermined value.

4. In an automatic flue gas heat recovery system according to claim 2 in which said conduit is connected to vacuum breaker vent valve means in position to direct air into said heat exchanger tube means in response to draining of water therefrom.

5. In an automatic flue gas heat recovery system according to claim 2 in which a flow control valve activatable between opened and closed conditions is in said conduit means, said control means being effective to activate said flow control valve to open condition in response to the operational status of the heat source, and said thermostat control means being effective to activate said flow control valve to closed condition in response to a temperature in said storage tank means exceeding said predetermined value.

6. In an automatic flue gas heat recovery system according to claim 4 in which said drain valve means is connected to one of said two conduits and said vacuum breaker vent valve means is connected to the other of said two conduits.

7. In an automatic flue gas heat recovery system according to claim 5 in which said flow control valve is in one of said two conduits on the inlet side of said heat exchanger tube means and a vacuum breaker vent valve means is connected to the same conduit between said flow control valve and said heat exchanger tube means.

8. In an automatic flue gas heat recovery system according to claim 2 in which said hot water storage tank means includes two separate tanks, one of which is connected to the conduit means to receive heated water from said heat exchanger tube means, and the other of which has self-contained water heating means independent of said heat exchanger tube means, said tanks are connected to said other tank.

9. In an automatic flue gas heat recovery system:
a heat exchanger housing adapted to be positioned in a flue gas flow from a heat source;
heat exchanger tube means in said housing;
hot water storage tank means including main tank means and auxiliary tank means, at least said auxiliary tank means having heating means therein;
water inlet and outlet conduits connected to the hot water storage tank means;
conduit means including main conduit means connecting the main tank means with the heat exchanger tube means to provide a main closed loop for circulating water therebetween, and auxiliary conduit means connecting the two tank means to provide an auxiliary closed loop for circulating water therebetween;
motor driven pump means including main and auxiliary pump means in said main and auxiliary conduit means respectively, said pump means being effective when activated to circulate water in the respective closed loops;
drain valve means being activatable between opened and closed conditions and connected to said main conduit means in position to drain said heat exchanger tube means when opened;
thermostat control means including temperature sensors associated with the heat exchanger housing and hot water storage tank means and connected to the pump means and drain valve means to control activation thereof;
said thermostat control means including means for activating said main pump means and closing said drain valve means in response to a predetermined temperature in said heat exchanger housing;
said thermostat control means including means for activating said auxiliary pump means in response to a predetermined temperature in said main tank means; and
said thermostat control means including means for deactivating both of said pump means and opening said drain valve means in response to a predetermined temperature in one of said tank means.

10. In an automatic flue gas heat recovery system according to claim 9, the improvement in which said thermostat control means includes separate temperature sensors in said heat exchanger housing and in each of said main and auxiliary tank means.

11. In an automatic flue gas heat recovery system according to claim 9, the improvement in which said main conduit means includes a flow control valve activatable between opened and closed conditions and located on the downstream side of said main pump means, and said thermostat control means includes means for opening said flow control valve when said drain valve means is closed, and vice versa.

12. In an automatic flue gas heat recovery system according to claim 9, the improvement in which said thermostat control means includes means for activating the heating means in the auxiliary tank means to maintain a predetermined water temperature therein, and said thermostat control means further includes means for activating said auxiliary pump means in response to the temperature in said main tank means reaching a value at least equal to said predetermined temperature in the auxiliary tank means.

13. In an automatic flue gas heat recovery system according to claim 12, the improvement in which said water outlet conduit is connected to said auxiliary tank means.

* * * * *